(12) United States Patent
Englert (10) Patent No.: US 10,008,754 B2
(45) Date of Patent: Jun. 26, 2018

(54) METAL-AIR BATTERY

(71) Applicant: Mahle International GmbH, Stuttgart (DE)

(72) Inventor: Peter Englert, Bad Friedrichshall (DE)

(73) Assignee: Mahle International GmbH (DE)

( * ) Notice: Subject to any disclaimer, the term of this patent is extended or adjusted under 35 U.S.C. 154(b) by 59 days.

(21) Appl. No.: 15/307,807

(22) PCT Filed: Apr. 29, 2015

(86) PCT No.: PCT/EP2015/059385
§ 371 (c)(1),
(2) Date: Oct. 28, 2016

(87) PCT Pub. No.: WO2015/165993
PCT Pub. Date: Nov. 5, 2015

(65) Prior Publication Data
US 2017/0047627 A1    Feb. 16, 2017

(30) Foreign Application Priority Data

Apr. 29, 2014   (DE) .................. 10 2014 208 044
Apr. 29, 2014   (DE) .................. 10 2014 208 047

(51) Int. Cl.
*H01M 12/08*   (2006.01)
*H01M 2/08*    (2006.01)
(Continued)

(52) U.S. Cl.
CPC ............. *H01M 12/08* (2013.01); *H01M 2/08* (2013.01); *H01M 2/30* (2013.01); *H01M 2/40* (2013.01);
(Continued)

(58) Field of Classification Search
CPC .......................... H01M 12/06; H01M 12/08
See application file for complete search history.

(56) References Cited

U.S. PATENT DOCUMENTS 3,847,671 A    11/1974  Leparulo et al.
4,822,698 A     4/1989  Jackovitz et al.
(Continued)

FOREIGN PATENT DOCUMENTS

CH       679438 A5    2/1992
DE      2417571 A1   11/1974
(Continued)

OTHER PUBLICATIONS

English abstract for DE-69804236.
(Continued)

*Primary Examiner* — Olatunji Godo
(74) *Attorney, Agent, or Firm* — Fishman Stewart PLLC (57) ABSTRACT

A metal-air battery may include a housing, at least one cathode disposed in the housing between an air space and an electrolyte space, and at least one metal anode disposed in the electrolyte space. The battery may also include an air path leading through the housing from an air inlet to an air outlet of the housing, both of which may be fluidically connected to the air space, and an air supply device for generating an air flow which may follow the air path and act upon the cathode. The battery may further include an electrolyte path leading through the housing from an electrolyte inlet to an electrolyte outlet of the housing, both of which may be fluidically connected to the electrolyte space, and an electrolyte supply device for producing an electrolyte flow which may follow the electrolyte path and act upon the anode and the cathode.

39 Claims, 2 Drawing Sheets

(51) Int. Cl.

| | | |
|---|---|---|
| *H01M 2/30* | (2006.01) | |
| *H01M 2/40* | (2006.01) | |
| *H01M 6/50* | (2006.01) | |
| *H01M 12/06* | (2006.01) | |
| *H01M 8/04276* | (2016.01) | |
| *H01M 8/0662* | (2016.01) | |
| *H01M 10/42* | (2006.01) | |
| *H01M 4/38* | (2006.01) | |
| *H01M 4/46* | (2006.01) | |
| *H01M 16/00* | (2006.01) | |
| *H01M 4/02* | (2006.01) | |

(52) U.S. Cl.
CPC ........... *H01M 4/38* (2013.01); *H01M 6/5022* (2013.01); *H01M 6/5038* (2013.01); *H01M 8/04276* (2013.01); *H01M 8/0662* (2013.01); *H01M 10/4214* (2013.01); *H01M 12/06* (2013.01); *H01M 4/381* (2013.01); *H01M 4/463* (2013.01); *H01M 6/5077* (2013.01); *H01M 16/006* (2013.01); *H01M 2004/025* (2013.01); *H01M 2220/20* (2013.01); *H01M 2300/0014* (2013.01)

(56) References Cited

U.S. PATENT DOCUMENTS

| | | |
|---|---|---|
| 6,127,061 A | 10/2000 | Shun et al. |
| 6,379,828 B1 | 4/2002 | Worth |
| 6,573,008 B1 | 6/2003 | Hasvold |
| 2009/0130504 A1 | 5/2009 | Van Burdine |
| 2011/0003221 A1 | 1/2011 | Mizuno |
| 2012/0098497 A1 | 4/2012 | Ogane et al. |
| 2013/0078535 A1 | 3/2013 | Aizawa |
| 2014/0004394 A1 | 1/2014 | Kerkamm |
| 2014/0011058 A1 | 1/2014 | Adachi et al. |

FOREIGN PATENT DOCUMENTS

| | | |
|---|---|---|
| DE | 69804236 T2 | 10/2002 |
| DE | 69821078 T2 | 11/2004 |
| DE | 69830917 T2 | 5/2006 |
| DE | 112009000223 T5 | 12/2010 |
| DE | 102010033020 A1 | 2/2012 |
| DE | 102011002549 A1 | 7/2012 |
| DE | 112010002707 T5 | 10/2012 |
| DE | 102013107033 A1 | 1/2014 |
| FR | 1353051 A | 2/1964 |
| WO | WO-9939397 A1 | 8/1999 |
| WO | WO-2004038828 A2 | 5/2004 |
| WO | WO-2012/156972 A1 | 11/2012 |
| WO | WO-2013128445 A1 | 9/2013 |
| WO | WO-2013150519 A1 | 10/2013 |
| WO | WO-2013150520 A1 | 10/2013 |
| WO | WO-2013150521 A1 | 10/2013 |
| WO | WO-2014009951 A1 | 1/2014 |

OTHER PUBLICATIONS

English abstract for DE-102010033020.
International Search Report for PCT/EP2015/059385, dated Dec. 11, 2015.

METAL-AIR BATTERY

CROSS-REFERENCE TO RELATED APPLICATIONS

This application claims priority to German Patent Application No. 10 2014 208 044.4, filed on Apr. 29, 2014, German Patent Application No. 10 2014 208 047.9, filed on Apr. 29, 2014, and International Patent Application No. PCT/EP2015/059385, filed on Apr. 29, 2015, all of which are hereby incorporated by reference in their entireties.

TECHNICAL FIELD

The present invention relates to a metal-air battery, in particular an aluminium-air battery. The invention further relates to a battery system comprising at least two such batteries. The invention additionally relates to an electric motor vehicle fitted with at least one such battery or with one such battery system. Finally the invention relates to a method for operating such a battery.

BACKGROUND

Metal-air batteries are usually primary cells, i.e. electrically non-rechargeable galvanic cells which produce a certain electrical voltage due to a chemical reaction of the respective metal with atmospheric oxygen. Such a primary cell can also be designated as fuel cell. Unlike primary cells, secondary cells are so-called rechargeable batteries which can be electrically recharged.

An exemplary structure for a zinc-air battery is known from WO 2012/156972 A1.

A zinc electrode for use in a rechargeable battery is known from WO 2013/150519 A1.

Known from WO 2013/128445 A1 is a metal-air battery in which spent fuel, namely zinc, is removed with the aid of a liquefier.

It is known from WO2013/150520 A1 for a metal-air battery to flush an electrolyte with a washing solution to transfer the battery into a standby mode.

It is known from WO 2013/150521 A1 for a metal-air battery to renew an electrolyte as required.

It is known from WO 2014/009951 A1 to couple a metal-air battery to a rechargeable electrical energy storage device, i.e. a rechargeable battery in such a manner that varying power requirements are met by a corresponding distribution of the power requirement to the metal-air battery and the respective rechargeable battery. By this means the metal-air battery is buffered with the rechargeable battery and the metal-air battery can be operated in a relatively constant manner since power fluctuations can be compensated by the rechargeable battery.

Controls for chargeable batteries are known from DE 11 2010 002 707 T5, from DE 11 2009 000 223 T5, from DE 10 2011 002 549 A1, from DE 10 2013 107 033 A1 and from DE 24 17 571 A.

A redox-flow battery is known from WO 99/39397 A1 in which ion exchange membranes of a plurality of battery cells which are combined into a cell stack are exposed to a positive half-cell electrolyte on the one hand and to a negative half-cell electrolyte on the other hand.

Metal-air batteries can be of great interest for use in electric vehicles since they have a very high chemical energy density. With the aid of these metal-air batteries, the range of an electric vehicle can be increased significantly compared with rechargeable batteries.

A problem with metal-air batteries is the implementation of a power control which enables a dynamic adaptation, suitable for the vehicle, of the electrical energy which can be delivered with the aid of the metal-air battery, to the electrical energy actually required by the vehicle. In vehicles with electric-motor drive, the required electrical energy is subjected to severe fluctuations which result from the usually non-steady-state driving mode.

If the metal-air battery is designed for a high power, the lifetime of the battery is reduced even when only comparatively little power is required. Accordingly a complex power control is usually required, e.g. combined with a rechargeable battery as power buffer.

SUMMARY

The present invention is concerned with the problem of providing an improved embodiment for a metal-air battery or for a relevant operating method or for a vehicle equipped therewith which is in particular characterized by a high efficiency and/or a high lifetime for the battery. Furthermore a simple adaptability of the battery to varying power requirements is desired.

This problem is solved according to the invention by the subject matters of the independent claims. Advantageous embodiments are the subject matter of the dependent claims.

The invention is based with regard to the metal-air battery is based on the general idea of arranging a metal anode and a cathode in a housing of the battery in such a manner that the anode and an electrolyte side of the cathode can be acted upon with electrolyte whereas an air side of the cathode can be acted upon with air. This results in a compact structure with high power density. Expediently anode and cathode are arranged in the housing such that the cathode separates the air space from the electrolyte space so that the cathode is acted upon by air located in the air space on the one hand and by electrolyte located in the electrolyte space on the other hand. The cathode is therefore directly exposed to the fluidic working media of the battery.

An embodiment is preferred in which the cathode is a hollow body. This can, for example, be cylindrical or quadrangular, and accordingly have a round, e.g. elliptical, oval or circular or a polygonal, e.g. rectangular, quadratic or other polygonal cross-section.

The in this respect hollow cathode can, according to a preferred embodiment, enclose the electrolyte space in a circumferential direction and itself be enclosed by the air space in the circumferential direction, wherein the anode is disposed in the interior of the hollow cathode and the housing encloses the air space in the circumferential direction. The circumferential direction relates here to the longitudinal central axis of the cathode. Particularly advantageous in this connection is an embodiment in which the anode is arranged relative to the cathode so that a longitudinal central axis of the cathode and a longitudinal central axis of the anode run parallel to one another and in particular run coaxially inside one another, i.e. coincide. In this case, the electrolyte space between anode and cathode can be annular. Also the air space between cathode and housing jacket can be annular. In this respect, the invention is based on the general idea to arrange the anode in a hollow cathode which for its part is arranged in a housing of the battery. An electrolyte space is located radially between anode and cathode. An air space is located radially between cathode and housing. This results in an extremely compact structure for the battery whereby a high power density can be achieved. Furthermore, this structure enables a particularly favourable flow guidance for the electrolyte on the one hand and for the air on the other hand. Thus, an air path leading through the housing is provided which leads from an air inlet of the housing, which is connected fluidically to the air space, to an air outlet of the housing which is connected fluidically to the air space. An air flow following the air path and acting on the cathode can thus be produced with the aid of an air supply device. Furthermore an electrolyte path through the housing is provided which leads from an electrolyte inlet of the housing, which is connected fluidically to the electrolyte space, to an electrolyte outlet of the housing which is connected fluidically to the electrolyte space. An electrolyte flow following the electrolyte path and acting on the anode and the cathode can now be generated with the aid of an electrolyte supply device. As a result of the coaxial arrangement of housing, air space, cathode, electrolyte space and anode, low flow resistances can be achieved for the air path and for the electrolyte path so that in particular large volume flows for the air along the air path on the one hand and for the electrolyte along the electrolyte path on the other hand can be achieved. Consequently sufficient oxygen can be supplied subsequently to the cathode particularly simply. In addition, sufficient unused electrolyte can be supplied subsequently to the anode or spent electrolyte can be removed. In the present connection "action" of a fluid on a body can be understood as contact of the body being acted upon by the respective fluid regardless of whether the fluid is supplied by means of positive pressure or extracted by means of negative pressure.

Furthermore, it is in particular possible to configure the air supply device so that the volume flow of air along the air path is adjustable in a relatively large range, i.e. is variable. Likewise the electrolyte supply device can be simply configured so that the volume flow of electrolyte is adjustable in a relatively large range, i.e. is variable. In this way, the electrical power which can be tapped at the metal-air battery can be adjusted particularly simply hydraulically by varying the electrolyte flow and/or pneumatically by varying the air flow.

For the hollow cathode, fundamentally arbitrary cross-section perpendicular to its longitudinal central axis are conceivable, e.g. a round or cylindrical cross-section or a triangular, quadrangular or polygonal cross-section. Preferably this is a circular cylindrical cross-section.

Fundamentally arbitrary cross-sections perpendicular to its longitudinal central axis are also feasible for the anode, such as for example cylindrical or polygonal cross-section. Preferably a circular cylindrical cross-section is used here.

The same also applies to the housing. The housing can also have fundamentally arbitrary cross-sections. It is expediently formed corresponding to the cathode. Accordingly the housing is preferably cylindrical with a round, in particular circular cross-section. Alternatively polygonal, i.e. multi- or polyangular cross-sections are feasible.

The anode is preferably configured as a solid so that this comprises a solid anode, i.e. for example not a liquid anode. This solid anode is consumed during operation of the battery so that this is an expendable anode.

According to a preferred embodiment, the metal-air battery is configured as an aluminium-air battery so that the anode has an anode body exposed to the electrolyte which comprises an aluminium alloy or consists thereof.

According to an advantageous embodiment, a control device can be provided for operation of the metal-air battery which on the one hand is electrically connected to the air supply device and on the other hand to the electrolyte supply device. The control device can now be configured or programmed so that depending on a current electrical power requirement at the metal-air battery, it actuates the air supply device to produce an air flow adapted to this power requirement and/or actuates the electrolyte supply device to produce an electrolyte flow adapted to this power requirement. By varying the volume flow of electrolyte and/or air, the electrical power which can be tapped at the metal-air battery can be varied. Since the volume flows of air and/or electrolyte can be varied comparatively simply and comparatively rapidly within a relatively large range, the electrical power which can be tapped at the metal-air battery can be adapted relatively rapidly to the currently required power by means of the procedure presented here. In particular, the provided power which can be tapped at the metal-air battery can be adapted in a short time to low power requirements by reducing the air flow and/or electrolyte flow whereby the lifetime of the metal-air battery can be significantly lengthened. The power control or power regulation presented here operates hydraulically or hydropneumatically.

In particular, the control device can achieve a power control where it takes account of the current power requirement as the desired value and takes account of an electrical power measured currently at electrical or galvanic power connections of the metal-air battery as the actual value. By means of a desired-actual value comparison, the control device can track the volume flow for the electrolyte and/or for the air accordingly.

According to another advantageous further development, the control device can be configured or programmed so that depending on the current power requirement it actuates the electrolyte supply device to produce the electrolyte flow adapted to this power requirement and actuates the air supply device to produce an air flow adapted to the adapted electrolyte flow. In other words, the control device initially determines in a first step the volume flow of electrolyte required for the current power requirement and actuates the electrolyte supply device accordingly. In a second step which can take place quasi-simultaneously to the aforesaid first step, the control device determines depending on the determined electrolyte volume flow an air volume flow required for this and actuates the air supply device accordingly.

In another advantageous further development, it can be provided that the control device is configured or programmed so that it actuates the electrolyte supply device for emptying the electrolyte path of electrolyte for shutting down the metal-air battery. As a result of such emptying of the electrolyte path, in particular the electrolyte space, the chemical reaction between anode and electrode in the metal-air battery is completely interrupted whereby the decomposition or dissolution of the anode is severely reduced. Accordingly the lifetime of the battery is lengthened.

In another advantageous embodiment, the anode can be rotatably mounted about its longitudinal central axis on the housing. As a result of the twistability of the anode relative to the housing, a rotation of the anode relative to the vertical housing can be achieved. The anode thereby also rotates relative to the cathode which is torque-proof relative to the housing. The rotating anode improves the flow of electrolyte around the anode. At the same time, reaction products can be better released from the anode as a result of centrifugal forces, which increases the surface area of the anode available for electrolysis.

If the anode is arranged rotatably in the housing, a corresponding rotary drive, for example, by an electric motor, can fundamentally be provided in order to set the anode in rotation. Alternatively it can be provided that the anode is configured so that a rotation of the anode drives the electrolyte in the electrolyte path. By this means the anode acquires an additional function. Particularly advantageous here is a further development in which the anode has flow guiding structures on its outer side exposed to the electrolyte space which drive the electrolyte when the anode is rotating. In particular, rotor blades arranged in a screw shape are feasible.

According to another embodiment, it can be provided that the anode is driven by the electrolyte flow i.e. hydraulically. For this purpose, the electrolyte is guided past the anode so that the electrolyte flow rotatingly drives the anode. Thus, the kinetic energy of the electrolyte flow is used to set the anode in rotation. An additional, energy-consuming electric drive can thus be dispensed with.

According to an advantageous further development, the electrolyte inlet can be arranged tangentially to the electrolyte space at a first end region of the electrolyte space whilst the electrolyte outlet is arranged at a second end region of the electrolyte space, in particular axially. As a result of the spaced-apart arrangement of electrolyte inlet and electrolyte outlet, a quasi-axial through-flow of the electrolyte space is achieved for the electrolyte. As a result of the tangential arrangement of the electrolyte inlet, a screw-shaped through-flow is obtained in the electrolyte space which can also be designated as swirling flow. As a result of surface friction, the swirling flow results in a rotational movement of the anode. The tangential arrangement can be found in a cross-section of the air space or of the cathode which runs perpendicular to the longitudinal central axis of the cathode.

Additionally or alternatively, the anode can have flow-guiding structures on its outer side exposed to the electrolyte space which transmit a torque to the anode when the anode is exposed to the electrolyte flow. Thus, kinetic energy of the electrolyte flow can be used to drive the anode.

The rotation of the anode can be accomplished by a corresponding volume flow of the electrolyte with a comparatively high rotational speed which in particular can be selected to be so high that sufficient centrifugal forces are produced to enable a release of reaction products from the anode. Rotational speeds of up to 300 revolutions per minute are feasible, for example.

The housing is expediently insulated or made from an electrically insulated material, for example, of plastic. The arrangement of the anode in the housing is advantageously accomplished so that the longitudinal central axis of the anode and therefore also a longitudinal central axis of the cathode extend substantially vertically in the usage state of the battery.

According to another advantageous embodiment, the anode or an anode body can be configured cylindrically and connected mechanically and electrically to a metal supporting plate. This design enables the anode to be positioned more simply in the housing, e.g. coaxially in the cathode.

According to an advantageous embodiment, the in particular circular supporting plate can be mounted rotatably about a longitudinal central axis of the anode by means of an axial bearing on the housing. Thus, the anode is mounted rotatably on the housing in the region of its supporting plate. The supporting plate can be made of a different metal to the anode, whereby the formation of a suitable mounting in the region of the supporting plate is simplified. By means of the axial bearing, axial forces can be supported particularly simply between the anode and the housing. The axial bearing can be arranged, for example, on an axial face of the housing which is arranged at the top in the operating state of the battery.

In another further development, an anode-side galvanic power connection of the metal-air battery which represents an electrical negative pole can be formed on the axial bearing. The axial bearing has a region firmly connected to the housing which can also be designated as stationary region and which is particularly suitable for the formation of an anode-side power connection. As a result, the said anode-side power connection is stationary although the anode itself is rotatable relative to the housing. The current collection at the battery is thereby simplified.

According to another further development, the axial bearing can be configured as a plain bearing and comprise a sliding metal ring which lies in a housing-side annular bearing shell and on which the supporting plate rests and on which the supporting plate slides when the anode rotates. As a result of the configuration of the axial bearing as a plain bearing, a comparatively large contact area can be achieved between supporting plate and axial bearing or sliding metal ring, which simplifies the power transmission between anode and axial bearing.

An embodiment is particularly advantageous in which the sliding metal ring comprises an annular body made of a sliding metal alloy and at least one preferably metal heating conductor arranged in the annular body by means of which the annular body can be heated. The heating of the annular body can improve the power transmission between sliding metal ring and supporting plate.

A further development is particularly advantageous in which a power supply of the heating conductor is configured so that the heating conductor heats the annular body to a predetermined operating temperature which lies below a melting point of the sliding metal alloy and at the same time lies so close to the melting point of the sliding metal alloy that a surface melting occurs on the annular body. The sliding metal alloy here is a low-melting alloy whose melting point can, for example, lie between 50° C. and 300° C. The predetermined operating temperature lies for example 10% to 15% below the melting point, in particular about 40° C. below the melting point. As a result of the surface melting thus brought about, a liquid metal film is formed on the surface of the sliding metal ring on which the supporting plate slides in the manner of a hydro bearing. On the one hand, the friction between supporting plate and sliding metal ring is thereby significantly reduced. On the other hand a significantly improved electrical contact is achieved as a result of the liquid metal film. For example, a formation of an oxide layer of the surfaces in contact with one another can be reduced in the liquid metal film. As a result of the configuration presented here, an extremely low-loss electrical contact can be achieved between supporting plate and axial bearing whereby high currents can be achieved at low voltages.

The control of the power supply of the heating conductor with the aid of which the desired operating temperature can be adjusted in the annular body can be accomplished, for example, by means of a temperature measurement. It is also feasible to connect the respective heating conductor in series with a PTC element where PTC stands for positive temperature coefficient. The respective PTC element is tuned to the desired operating temperature. In this way, a self-regulating heating of the respective heating conductor can be provided without major electronic expenditure by which means the annular body can be specifically heated to the predetermined operating temperature.

The power supply of the respective heating conductor can expediently be incorporated into the current path between the anode and the anode-side galvanic power connection.

In another advantageous embodiment, the air supply device can have a concentrating device upstream of the air inlet which increases the oxygen fraction in the air flow. Thus, an enrichment of the air flow with regard to the entrained oxygen is accomplished which accordingly improves the electrolysis function at the cathode. Such a concentrating device can, for example, be equipped with a corresponding filter membrane or a corresponding molecular sieve whereby on one side the nitrogen fraction increases and the oxygen fraction decreases whilst on the other side the nitrogen fraction decreases and the oxygen fraction increases. For example, with the aid of such a concentrating device the natural oxygen content can be increased from about 20% in air to over 90%.

If a filter medium which must be periodically regenerated is used here, the concentrating device comprises two or more concentrating units so that an increase in the oxygen fraction by means of at least one concentrating unit can be carried out permanently whilst at the same time another concentrating unit is regenerated.

In another advantageous embodiment, the electrolyte supply device can have an electrolyte circuit which comprises a flow and a return. The flow leads from an electrolyte tank to the electrolyte inlet whilst the return leads from the electrolyte outlet to the electrolyte tank. By using such a closed electrolyte circuit, the electrolyte can be used permanently. In particular, higher volume flows for the electrolyte are thereby possible which are so high that the electrolyte is not completely unusable during flow through the electrolyte path.

According to an advantageous further development, a flow pump for driving the electrolyte is arranged in the flow, For example, the current volume flow of electrolyte which is guided through the electrolyte path can be adjusted by means of the flow pump.

In another embodiment, a return pump for driving the electrolyte can be arranged in the return. The return pump is used to convey the electrolyte from the electrolyte outlet to the electrolyte tank. It can be used in particular for emptying the electrolyte space or the electrolyte path, e.g. in conjunction with a controllable ventilation and aeration of the electrolyte circuit.

In another embodiment, an electrolyte cleaning device for removing reaction products from the electrolyte can be arranged in the return. Such an electrolyte cleaning device is expediently located downstream of the return pump and can, for example, be configured as a centrifuge with membrane. With the aid of the electrolyte cleaning device, the electrolyte coming from the electrolyte space can be prepared in such a manner that the prepared electrolyte can again be supplied to the electrolyte space. The consumption of electrolyte is minimized by this means.

In another advantageous embodiment, a gas separating device can be arranged in the return for removing gases from the liquid electrolyte. Gases, in particular hydrogen, can be formed in the electrolysis reaction in the metal-air battery. The gases should be separated from the liquid electrolyte, for example, in order to improve the efficiency of the electrolysis function. In particular any formation of foam in the electrolyte should also be avoided. The gas separating device can, for example, operate with nozzles whereby particularly large gas bubbles are formed in the electrolyte which can be separated relatively easily.

According to an advantageous further development, the gas separating device can be fluidically connected via a gas line to a conversion device for converting the chemical energy of the separated gases into electrical and/or thermal energy. Thus, the chemical energy of the gas accumulating as waste product can be used to improve the entire energy efficiency of the metal-air battery.

According to an advantageous further development, the conversion device can be a catalytic burner which for example comprises a platinum mesh. The gaseous hydrogen is reacted with atmospheric oxygen to form water. The heat produced can be used for heating the battery. Alternatively to this, the conversion device can be formed by a hydrogen-air fuel cell in which the hydrogen gas is reacted with oxygen gas to form electrical current and heat. The heat can again be used for heating the battery. The electrical energy can also be used inside the battery or as additional electrical power. A suitable hydrogen-air fuel cell can be configured as a low-temperature fuel cell or PEM fuel cell where PEM stands for proton exchange membrane. In principle, an embodiment as a high-temperature fuel cell, in particular as a SOFC fuel cell, where SOFC stands for solid oxide fuel cell, is also feasible.

The heat transfer between the conversion device and the remaining metal-air battery can be accomplished, for example, with the aid of a heat transfer agent which is incorporated in the electrolyte circuit in a suitable manner. Also excess heat can be withdrawn from the electrolyte using this heat transfer agent. The heat can then be specifically used to heat the anode and/or the cathode to improve the electrolysis reaction.

In another advantageous embodiment, the air inlet can be arranged tangentially to the air space. Additionally or alternatively the air outlet can be arranged tangentially to the air space. The tangential arrangement of the air inlet or the air outlet can be used to configure the air flow inside the air space as screw-shaped, i.e. as swirling flow, with the result that an increased dwell time for the air flow inside the air space is achieved. This improves the transfer of oxygen between air flow and cathode.

According to another advantageous embodiment, an induction heating can be provided to heat the anode. Such induction heating operates, for example, with at least one induction coil which produces a stationary, spatially inhomogeneous electromagnetic field in the region of the anode. By moving or rotating the anode in this electromagnetic field, heat is induced in the anode, in particular in a wall region facing the electrolyte space which significantly improves the electrolysis reaction.

The respective induction heating can be arranged in the region of the cathode with the result that a particularly compact design can be achieved. The anode can be heated with the aid of induction heating and specifically in the wall region facing the electrolyte space. By this means only comparatively little energy is required to heat the actual reaction zone. The increased temperature in the reaction zone improves the energy efficiency of the metal-air battery.

A battery system according to the invention can comprise a plurality of metal-air batteries of the previously described type and is characterized by a common air supply device for producing the respective air flow through the air paths of the batteries and/or by a common electrolyte supply device for producing the respective electrolyte flow through the electrolyte paths of the batteries and/or by a common control device for operating the batteries. The batteries can be fluidically connected in series or in parallel with their air paths and/or with their electrolyte paths. This design simplifies the implementation of a high-performance battery system. In particular, a common air conveying device can be used for a plurality of batteries. Additionally or alternatively an electrolyte conveying device can be used for a plurality of batteries. Additionally or alternatively the control or regulation of the battery system is also simplified since a common control device can be used for a plurality of batteries.

A vehicle according to the invention, which can preferably comprise a road vehicle, has an electric motor drive and is fitted with at least one metal-air battery of the previously described type or with one battery system of the previously described type. The vehicle is characterized in particular by a power electronics for the power supply of the electric drive which is coupled unbuffered to the respective metal-air battery or to the buffer system. An electrically unbuffered coupling corresponds to a direct electrical connection which is made without an interposed electrical energy storage device, i.e. in particular without an interposed rechargeable battery. The invention is therefore based with regard to the vehicle on the general idea to use the respective metal-air battery directly for the power supply of the electric drive so that the interposition of an additional electrical energy storage device such as, for example a rechargeable battery can be dispensed with.

The invention is based with regard to the method on the general idea of hydraulically or pneumatically controlling or regulating the electrical power output of the metal-air battery. In other words, the power control or power regulation of the metal-air battery is accomplished by means of a specific variation of the volume flows of the electrolyte and/or the air. Such a pneumatic or hydraulic power regulation or control can be achieved particularly simply with conventional components such as, for example, fans and/or pumps.

Accordingly it can be provided according to an advantageous embodiment that at least one electrolyte conveying device, e.g. a suitable pump, is actuated accordingly to increase or reduce its conveying capacity for adaptation of the electrolyte flow. Additionally or alternatively it can be provided that at least one air conveying device, e.g. a suitable fan is actuated accordingly to increase or reduce its conveying capacity for adaptation of the air flow.

According to a another aspect of the invention or according to another advantageous embodiment, the anode can comprise an anode body which contains particles of an aluminium alloy in a sodium matrix. Combined with an electrolyte which contains water, a violent reaction usually takes place on contact of sodium with water which in this case however is stabilized by the aluminium particles. Nevertheless, there is a good solubility of the anode or the anode body in the respective electrolyte which enables a high electrical power.

Preferred is an embodiment in which the particles have a particle size of 10 µm to 100 µm, preferably of 40 µm to 60 µm. An embodiment in which the particles have a particle size of about 50 µm is particularly advantageous. As a result of the selected particle size, a comparatively large surface is obtained for the aluminium alloy which favours the desired electrolysis reaction.

In another advantageous embodiment, a fraction of particles in the anode body can lie in a range of 40% to 80%, preferably of 60% to 70%. An embodiment in which the fraction of particles in the anode body is about 65% is particularly advantageous in this case. The preceding percentage details relate to weight percent. The remaining fraction in the anode body is then formed by the sodium matrix. With a 65% particle fraction the matrix accordingly has a fraction of 35% in the anode body.

Of particular importance is an embodiment in which the aluminium alloy contains zirconium. By alloying zirconium to aluminium, the formation of a passive layer on the surface of the anode exposed to the electrolyte can be prevented specifically to such an extent that a formation of hydrogen is not preferred whereas at the same time a loss due to the transfer overvoltage is significantly reduced. Electrolysis at the anode surface results in a passivation of the anode surface which defines a transfer overvoltage. The larger the passive layer, the higher the transfer overvoltage which is required to penetrate the passive layer. By adding zirconium, the formation of the passive layer can thus be reduced which lowers the transfer overvoltage. It is important that the formation of the passive layer is not completely suppressed by the alloying of zirconium. The absence of the passive layer would have the result in the case of aluminium that the aluminium decomposes on contact with water to form hydrogen. However, such strong formation of hydrogen in the electrolyte is undesirable inside the metal-air battery.

According to an advantageous further development, the aluminium alloy can contain 0.01% to 1.00% zirconium, a content of 0.05% to 0.80% zirconium being preferred. A content of about 0.5% zirconium is particularly advantageous. In particular, the remainder of the aluminium alloy, apart from the usual unavoidable impurities, is formed by aluminium. Here also the percentage details relate to weight percent.

In order to produce such an anode, in addition a method is proposed in which a granular material comprising an aluminium alloy is introduced into a sodium melt and wherein an anode or an anode body comprising the sodium melt is cast with aluminium granular material introduced therein. In particular, rod-shaped cylindrical anode bodies can thus be achieved.

According to another independent aspect of the invention or according to another advantageous embodiment, the electrolyte for the previously described metal-air battery can be formed by an aqueous acid or an aqueous lye containing at least one halogen and at least one surfactant. An aqueous lye is preferred. With the aid of the respective halogen, the chemical reaction at the anode surface can be improved since as a result of the addition of the halogen, the acid or the lye can better penetrate the passive layer of the respective metal anode. As a result of the addition of the respective surfactant, the electrochemical reaction can be improved since the surfactant improves the electron exchange at the anode surface with the electrolyte. Furthermore the surfactant brings about an improved dissolution of the gases formed during the reaction which also improves the chemical reaction.

Advantageously the respective acid or lye comprises a 10% to 40% fraction in water. A 20%±5% acid or lye is preferred. The percentage details here again relate to weight percent.

According to an advantageous embodiment, the halogen can comprise a 0.1% to 4.0%, preferably 0.5% to 2% fraction in the acid or lye. Here also this involves weight percent. The halogen preferably comprises a fluoride, in particular potassium aluminium pentafluoride.

In another embodiment, the acid or lye can contain the surfactant in a concentration of 0.1% to 2%, preferably in a concentration of 0.2% to 1%. Preferably the surfactant is sodium lauryl sulphate.

Further important features and advantages of the invention are obtained from the subclaims, from the drawings and from the relevant description of the figures by reference to the drawings.

It is understood that the aforesaid features and those to be explained hereinafter can be used not only in the respectively specified combination but also in other combinations or alone without departing from the framework of the present invention.

Preferred exemplary embodiments of the invention are shown in the drawings and are explained in detail in the following description where the same reference numbers refer to the same or similar or functionally the same components.

BRIEF DESCRIPTION OF THE DRAWINGS

In the figures, in each case schematically.

DETAILED DESCRIPTION

Figure 1:
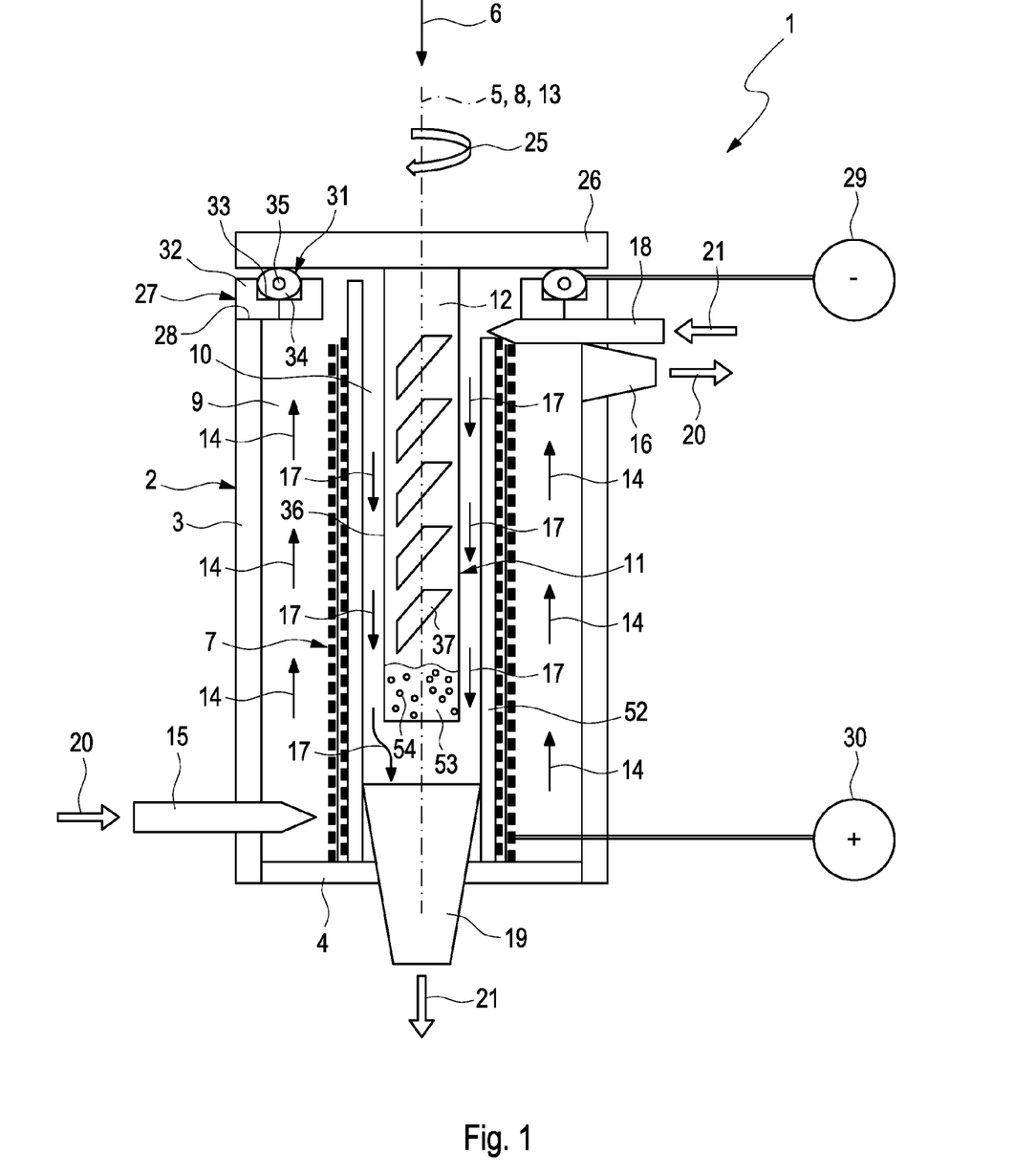
FIG. 1 shows a highly simplified circuit-diagram-like schematic diagram of a metal-air battery without peripheral components.
Figure 2:
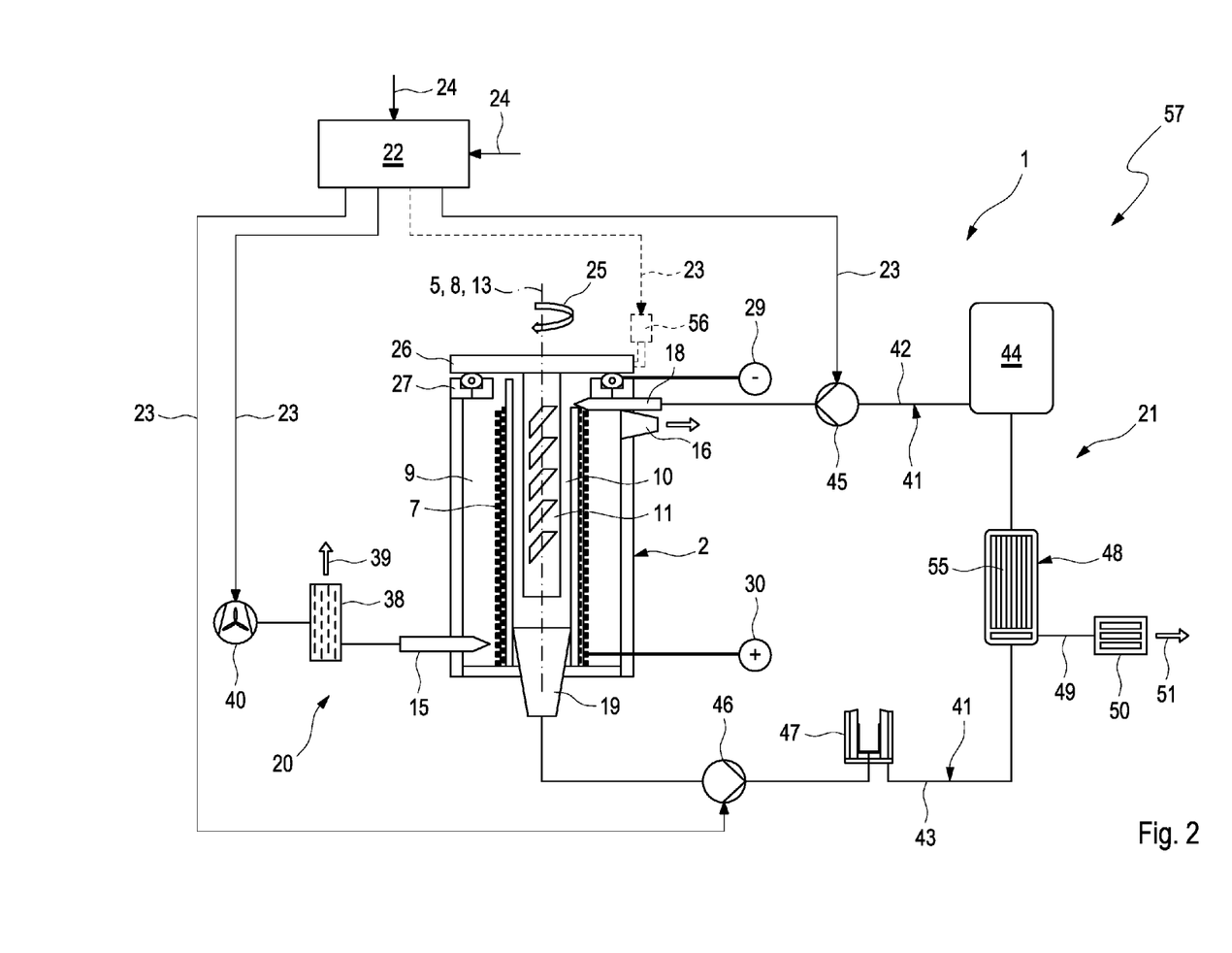
FIG. 2 shows a view as in FIG. 1 but with peripheral components.

According to FIGS. 1 and 2, a metal-air battery 1 which preferably comprises an aluminium-air battery comprises a housing 2 which is electrically insulated and preferably consists of an electrically insulating material, for example, of plastic. In the example shown, the housing 2 is configured as a cylindrical container and has a cylindrical jacket 3 as well as a plate-shaped, in particular circular base 4. In the installed state or ready-to-use state of the metal-air battery 1 which is hereinafter designated for short as battery 1, the housing 2 is arranged so that a longitudinal central axis 5 of the housing 2 is aligned substantially vertically, i.e. substantially parallel to the direction of gravity 6, which is indicated by an arrow in FIG. 1. The battery 1 further comprises at least one hollow-cylindrical cathode 7 which is disposed in the housing 2 and specifically preferably so that in the ready-to-use state of the battery 1, a longitudinal central axis 8 of the cathode 7 runs substantially parallel to the direction of gravity 6. In the example shown the housing 2 and the cathode 7 are arranged coaxially and concentrically with respect to one another so that the two longitudinal central axes 5, 8 coincide. The cathode 7 separates an air space 9 from an electrolyte space 10 in the housing 2. The cathode 7 usually consists of a porous material whereby a large surface area is made available to the usually liquid electrolyte which enables contact with the gaseous oxygen contained in the air. For example, the cathode can be formed from a permeable membrane or comprise such a membrane.

In the example, the cathode 7 is a hollow body which encloses an interior in a circumferential direction of the cathode 7. This interior forms the electrolyte space 10. The cathode 7 is preferably hollow-cylindrical and has a cylindrical, preferably circular cylindrical cross-section. Other cross-sectional geometries are also feasible such as, for example, triangular, quadrangular, in particular rectangular and square, as well as pentagonal or generally multiangular or polygonal cross-sections.

Furthermore the battery 1 comprises at least one metal anode 11 which is arranged in the electrolyte space 10. The anode 11 possesses in the example a cylindrical anode body 12 with a longitudinal central axis 13 and is arranged coaxially to the cathode 7 and in particular concentrically thereto. Accordingly the longitudinal central axes 5, 8, 13 coincide here. The anode 11 is preferably configured as a solid anode or as a solid-material anode which dissolves or is consumed during operation of the battery 1.

If, as in the example, here a cylindrical anode 11 in a cylindrical hollow cathode 7 is used which for its part is disposed in a cylindrical housing 2, the electrolyte space 10 and the air space 9 are then largely annular, where a concentric arrangement is preferred.

An air path 14 leads through the housing 2, which air path is indicated by arrows in FIG. 1 and which fluidically connects an air inlet 15 of the housing 2 inside the housing 2 through the air space 9 to an air outlet 16 of the housing. In addition, an electrolyte path 17 leads through the housing 2, which electrolyte path is indicated by arrows in FIG. 1 and which fluidically connects an electrolyte inlet 18 of the housing 2 through the electrolyte space 10 to an electrolyte outlet 19 of the housing 2.

The battery 1 is additionally fitted with an air supply device 20 with the aid of which an air flow can be generated for operation of the battery 1 which during operation of the battery 1 follows the air path 14 and thereby acts upon the cathode 7, i.e., flows against it or flows around it. In addition, an electrolyte supply device 21 is provided with the aid of which an electrolyte flow can be generated for operation of the battery 1 which during operation of the battery 1 follows the electrolyte path 17 and thereby acts upon the anode 11 on the one hand and on the cathode 7 on the other hand, i.e., flows against it or flows around it.

For operation of the battery 1 according to FIG. 2 a control device 22 is provided, for example, in the form of a controller. The control device 22 is electrically connected to the air supply device 20 and to the electrolyte supply device 21, for example via corresponding control devices 23. The control device 22 can in addition be electrically connected via corresponding signal lines 24 to a sensor system of the battery 1 not shown in detail here. If the battery 1 is used in a superordinate system, in particular in a vehicle, for provision of electrical energy, the control device 22 is additionally connected via such a control line 24 to a control of the system or the vehicle not shown here so that the control device 22 knows the current electrical power requirement of the system or the vehicle. This current power requirement corresponds in this case to a current power requirement to the battery 1.

The control device 22 is now configured or programmed so that it actuates the air supply device 20 and/or the electrolyte supply device 21 depending on the current electrical power requirement at the battery 1 in such a manner that the air supply device 20 generates an air flow adapted to the current power requirement and/or the electrolyte supply device generates an electrolyte flow adapted to the current power requirement. Preferably the configuration or programming of the control device 22 is accomplished in such a manner that depending on the current power requirement it initially determines in a first step a suitable electrolyte flow, for example, by means of characteristic lines or characteristic areas or by means of suitable calculation formulae and then actuates the electrolyte supply device 21 in such a manner that this generates the determined electrolyte flow. In a second step, which can take place quasi parallel, the control device 22 can determine an air flow required for the determined electrolyte flow, likewise by means of characteristic lines or characteristic areas or by means of suitable calculation formulae so that it can then actuate the air supply device 20 to generate the determined air flow.

The control device 22 therefore enables a hydraulic or hydropneumatic power control or power regulation of the battery 1. If the power requirement increases, the volume flows for electrolyte and air are increased accordingly. If the power requirement is reduced on the other hand, the volume flows for electrolyte and air are reduced accordingly. Thus, the wear of the battery 1, i.e. the dissolution of the anode 11, is minimized. The battery 1 as a result has a comparatively long lifetime.

The control device 22 can additionally be programmed or configured so that for example for shutting down the battery 1 it actuates the electrolyte supply device 21 so that it empties the electrolyte space 10 or the entire electrolyte path 17 of electrolyte. This can additionally be followed by a flushing with a corresponding neutral or inert flushing medium.

As can be deduced in particular from FIG. 1, the anode 11 according to a preferred embodiment can be mounted rotatably about its longitudinal central axis 13 on the housing 2. A corresponding rotary movement is indicated by a rotary arrow 25 in the figures. As a result of the rotary movement of the anode 11, the contact between anode 11 and electrolyte is improved, which improves the electrolytic reaction to the current generation. At the same time, the rotation of the anode 11 at corresponding rotational speeds can produce centrifugal forces which can bring about a release of reaction products from the anode 11 which also improves the efficiency of the electrolyte reaction. The anode 11 or its anode body 12 is arranged on a metal supporting plate 26 and is mechanically and electrically connected to this. In this respect, the supporting plate 26 can also be counted as the circumference of the anode 11. The supporting plate 26 is mounted rotatably about the longitudinal central axis 13 of the anode 11 by means of an axial bearing 27 on the housing 2. To this end, the axial bearing 27 is arranged on a face 28 of the housing jacket 3 facing away from the base 4.

The battery 1 possesses two galvanic or electrical power connections 29, 30, namely a first electrical power connection 29 which represents a negative pole connected electrically to the anode 11 and a second electrical power connection 30 which represents a positive pole connected electrically to the cathode 7.

In the preferred example shown here, the anode-side galvanic power connection 29 is formed on the axial bearing 27 and firmly connected thereto, with the result that it is fixed in relation to the housing 2 and unlike the non-stationary or rotating anode 11, is arranged in a stationary or torque-proof manner.

The axial bearing 27 can fundamentally be configured as a roller bearing. Preferred however is the embodiment shown here in which the axial bearing 27 is configured as a plain bearing. In particular, the axial bearing 27 can to this end comprise a sliding metal ring 31 and an annular bearing shell 32. The bearing shell 32 is firmly arranged on the housing 2. The sliding metal ring 31 is inserted in the bearing shell 32. To this end the bearing shell 32 in the example has an axially open annular groove 33. The sliding metal ring 31 lies in the annular groove 33. The supporting plate 26 rests on the sliding metal ring 31 and during operation of the battery 1 can slide thereon. The sliding metal ring 31 has an annular body 34 which consists of a sliding metal alloy and at least one metal heating conductor 35 which is arranged in the annular body 34. The annular body 34 can be heated with the aid of the heating conductor 35. A power supply of the heating conductor 35 not shown here can be configured so that the heating conductor 35 heats the annular body 34 to a predetermined operating temperature which on the one hand lies below a melting point of the sliding metal alloy and which on the other hand lies so close to the melting point of the sliding metal alloy that a surface melting occurs on the annular body 34. For example, the operating temperature is about 10% to 20% below the melting point of the sliding metal alloy. A low-melting alloy is expediently used as sliding metal alloy which has a maximum melting point of 250° C. to 350° C. The heating of the annular body 34 to the predetermined operating temperature results in the said surface melting at the annular body 34 so that an external surface of the annular body 34 liquefies at least in the region of the supporting plate 26. On the one hand, this results in an extremely low-friction hydraulic plain bearing. On the other hand, the electrical contact between sliding metal ring 31 and supporting plate 26 is thereby improved significantly with the result that large currents can be transferred at low voltages.

The aforesaid power supply of the heating conductor 35 can be implemented by a separate power supply which can be controlled or regulated with the aid of the control device 22, e.g. in conjunction with a temperature sensor in order to adjust the desired operating temperature at the annular body 34. In a simplified case the power supply can be implemented with the aid of at least one PTC element which is connected in series with the heating conductor 35 at a suitable point. It is feasible in particular to introduce the heating conductor 35 in parallel into a flow path between the supporting plate 26 and the axial bearing 32, possibly including the respective PTC element.

According to another advantageous embodiment which is also shown here, the electrolyte path 17 is guided past the anode 11 or the anode body 12 so that the electrolyte flow during operation of the battery 1 rotatingly drives the rotatably mounted anode 11. To this end the electrolyte inlet 18 can be arranged tangentially to the electrolyte space 10. Accordingly the inflow of electrolyte into the electrolyte space 17 takes place close to the cathode 7. Furthermore it can be provided that the electrolyte inlet 18 is arranged on a first end region of the electrolyte space 10, here distally to the base 4 or in the installed state at the top whereas the electrolyte outlet 19 is arranged on a second end region of the electrolyte space 10 which is remote from the first end region. In the example of FIG. 1 or in the installed state, the electrolyte outlet 19 is located proximally to the base 4, i.e. at the bottom. In the example shown the electrolyte outlet 19 is in addition axially oriented and guided through the base 4. The arrangement of electrolyte inlet 18 and electrolyte outlet 19 at opposite axial ends of the electrolyte space 10 brings about an axial flow of electrolyte through the electrolyte space 10. The tangential arrangement of the electrolyte inlet 18 produces a swirling flow or screw-shaped flow in the electrolyte space 10 which rotatingly drives the anode 11 as a result of friction effects. However, the swirling flow in the electrolyte space 10 also enables comparatively high flow velocities with a comparatively high dwell time for the electrolyte in the electrolyte space 10.

In the example, the anode 11 or the anode body 12 is formed on an outer side 36 with flow-guiding structures 37 exposed to the electrolyte space 10. The flow-guiding structures 37 are configured in such a manner that they can transmit a torque to the anode 11 when the anode 11 is acted upon by an electrolyte flow. The flow-guiding structures 37 can therefore utilise kinetic energy of the electrolyte flow for driving the anode 11. The flow-guiding structures 37 can, for example, be formed by screw-shaped vanes or vane sections. The flow-guiding structures 37 are here provided cumulatively to the tangential electrolyte inlet 18 but can also be provided alternatively thereto.

Whereas in the previously described example, the electrolyte flow which is generated in a suitable manner is used to rotatingly drive the anode 11, according to another embodiment it can be provided to use the rotation of the anode 11 for driving the electrolyte, i.e. for producing the electrolyte flow. To this end, a rotary drive 56 indicated by the interrupted line in FIG. 2 can be provided which rotatingly drives the anode 11. In the example, the rotary drive 56 which for example can be an electric motor, drives the supporting plate 26 which carries the anode body 12. In this case, the flow-guiding structures 37 operate like rotor blades of an axial flow machine such as, for example a propeller. The driven anode 11 in this case forms an electrolyte conveying device. The control device 22 can be electrically connected to a rotary drive 56 via a corresponding control line 23 in order to be able to actuate the rotary drive 56 as required.

According to FIG. 2, the air supply device 20 has a concentrating device 38 upstream of the air inlet 15 with the aid of which the oxygen fraction in the air flow can be increased. The concentrating device 38 can in this case operate by means of suitable filter structures, in particular membranes and the like. Accordingly the air flow downstream of the concentrating device 38 has a significantly increased oxygen fraction compared to the air flow upstream of the concentrating device 38. An air flow with correspondingly reduced oxygen fraction or increased nitrogen fraction can be removed from the concentrating device 38 via an exhaust air line 39. The air supply device 20 here additionally possesses a fan 40 for driving or for producing the air flow. The fan 40 can be actuated by the control device 22. In addition, a "normal" air filter not shown here can be contained in the air supply device 20 by means of which liquid and/or solid impurities can be filtered out from the air.

According to FIG. 2 the electrolyte supply device 21 is fitted with a closed electrolyte cycle 41 which comprises a flow 42 and a return 43. The flow 42 connects an electrolyte tank 44 for providing the electrolyte fluidically to the electrolyte inlet 18. A flow pump 45 is located in the flow 42 which can be actuated with the aid of the control device 22. The return 43 connects the electrolyte outlet 19 fluidically to the electrolyte tank 44 and contains a return pump 46 which can be actuated with the aid of the control device 22. The flow pump 45 and return pump 46 here form electrolyte conveying devices.

In addition, an electrolyte cleaning device 47 is located downstream of the return pump 46 in the return 43, with the aid of which reaction products can be removed from the electrolyte. Thus, preparation of the electrolyte takes place inside the electrolyte cleaning device 47 so that cleaned or non-spent electrolyte can be supplied to the electrolyte tank 44. The electrolyte cleaning device 47 can, for example, be configured as a centrifuge, in particular with a membrane, The centrifuge can be configured as a back jet centrifuge which is driven by the kinetic energy of the electrolyte flow.

In addition, a gas separating device 48 can be arranged in the return 43 with the aid of which gases can be separated from the liquid electrolyte. In the example, the gas separating device 48 is located downstream of the return pump 46 or downstream of the electrolyte cleaning device 47. The separated gas comprises in particular hydrogen gas formed during the electrolyte reaction in the electrolyte space 10. For improved gas separation the gas separating device 48 can contain a plurality of nozzles by means of which the liquid electrolyte can be pressed through. It has been shown that the nozzles intensify bubble formation which simplifies the separation of gas from the liquid electrolyte.

The gas separating device 48 is fluidically connected via a gas line 49 to a conversion device 50 with the aid of which the chemical energy of the separated gas can be converted into electrical and/or thermal energy. For example, the conversion device 50 comprises a catalytic burner so that the combustible gases are converted exothermally to produce heat. Alternatively the conversion device 50 can comprise a hydrogen-air fuel cell which converts separated hydrogen gas with the aid of atmospheric oxygen into heat and electrical energy. The energy converted with the aid of the conversion device 50 from the separated gases can be supplied according to an arrow 51 to the battery 1 or the respective superordinate system i.e. in particular to the vehicle.

Furthermore a heat exchanger 55 can be located in the return 43 with the aid of which the returned electrolyte can be cooled. The heat thereby dissipated can either be supplied to the reaction zone inside the electrolyte space 10 or to the superordinate system to the battery 1, in particular the vehicle. In the example of FIG. 2 the heat exchanger 55 is integrated in the gas separating device 48.

According to FIG. 1, in order to increase a dwell time of the air flow inside the air space 9, it can be provided to arrange at least the air inlet 15 tangentially to the air space 9. Furthermore air inlet 15 and air outlet 16 are arranged at ends of the air space 9 remote from one another. A converse arrangement compared with the electrolyte path 17 is preferred here so that the so-called counter-flow principle can be implemented for the electrolyte path 17 and the air path 14. Accordingly, in the example the air inlet 15 is located proximally to the base 4 whilst the air outlet 16 is located distally to the base 4.

An induction heating 52 can be provided for heating the anode 11 or the anode body 12, which in the example is located in the area of the cathode 7. With the aid of the induction heating 52 the anode 11 or the anode body 12 can on the one hand be heated in a non-contact manner. On the other hand the heating takes place specifically in the area of the outer side 36 facing the electrolyte space 10, which is also exposed to the electrolyte flow. Consequently, the heating takes place specifically where an increased temperature is desired for an improved electrolyte reaction. The induction heating 52 is in particular configured so that a vertical electromagnetic field is generated with alternating magnetic polarization in the circumferential direction, which only takes place with a relative movement of the anode 11 for the desired surface heating of the anode 11 or the anode body 12 due to induction. The relative movement of the anode 11 is accomplished by rotation of the anode 11 about its longitudinal central axis 13. The inductive heating is speed-controlled where the rotational speed of the anode 11 depends on the volume flow of the electrolyte.

Although in the preferred example shown here only a single cathode 7 and only a single anode 11 are arranged in the housing 2, in another embodiment it can be provided to arrange a plurality of cathodes 7 and a plurality of anodes 11 in the same housing 2. It is also feasible to arrange a plurality of anodes 11 in the same cathode 7.

A battery system designated globally with 57 in FIG. 2 comprises at least two metal-air batteries 1 of the previously described type where however the peripheral aggregates or components can be used jointly. For example, a plurality of batteries 1 with a common electrolyte supply device 21 can be supplied with the respective electrolyte flow. In particular, a common control device 22 can be used in order to operate a plurality of batteries 1 or the battery system 57. In particular, common conveying devices can then also be used for producing the air flows or electrolyte flows for the individual batteries 1. The batteries 1 can be connected electrically in series or in parallel. Independently of this the electrolyte paths 17 of the batteries 1 can be arranged fluidically in parallel or in series. For example, a common electrolyte circuit 41 can be provided in which a plurality of batteries are fluidically incorporated so that further components of the electrolyte circuit 41 can be used jointly such as, for example, the electrolyte cleaning device 47 and/or the gas separating device 48. Likewise, the air paths 14 of the batteries 1 can be arranged fluidically in parallel or in series where further components of the air supply device 20 can also be used jointly here, such as, for example the concentrating device 38 or an air filter.

A vehicle which has an electric motor drive can be fitted with at least one battery 1 of the previously described type or with the previously described battery system 57 in order to provide electrical energy for the respective electric motor. It is of particular advantage here that as a result of its hydraulic or hydro-pneumatic power control or power regulation, the battery 1 presented here can be electrically connected in principle unbuffered to the respective power consumer of the vehicle or to a corresponding power electronics so that in particular heavy rechargeable batteries and the like can be dispensed with.

For operating such a metal-air battery 1 or such a battery system 57, it can now be provided that depending on a current power requirement for the metal-air battery 1 or for the battery system 57 a suitable electrolyte flow and/or a suitable air flow for the respective battery 1 is/are generated. Expediently for this purpose it can be provided that for adapting the electrolyte flow the respective electrolyte conveying device, i.e. preferably the electrolyte pumps 45, 46 or the rotatingly driven anode 11 is actuated accordingly to increase or reduce its conveying capacity and/or that for adapting the air flow the respective air conveying device, i.e. preferably the fan 40, is actuated accordingly to increase or reduce its conveying capacity.

The anode 11 can be produced according to FIG. 1 and according to a particularly advantageous embodiment so that it comprises an anode body 12 in a sodium matrix 53 in which particles 54 of an aluminium alloy are embedded. This therefore does not comprise an aluminium sodium alloy but an aluminium sodium composite material. This is achieved whereby a granular material comprising an aluminium alloy which forms the particles 54 is introduced into a sodium melt which thereby forms the matrix 53. The anode 11 or the anode body 12 can be cast with the aid of this sodium melt which contains the particles 54 of the aluminium alloy.

The particles 54 can, for example have a particle size of 10 μm to 100 μm. Preferred is a particle size of 40 μm to 60 μm. Particularly preferred is a particle size of about 50 μm. The fraction of the particles 54 in the anode body 12 is preferably in a range of 40% to 80%. A particle fraction of 60% to 70% is advantageous. Particularly preferred is a particle fraction of about 65%. Weight percent is meant here.

The aluminium alloy from which the particles 54 are produced can according to an advantageous embodiment contain zirconium. It has been found that zirconium in the aluminium alloy reduces the formation of a barrier layer at the outer side 36 of the anode body 12 so far that a direct reaction of aluminium with water to form aluminium oxide and hydrogen is largely avoided. The aluminium alloy preferably contains 0.01% to 1.00% zirconium. A zirconium fraction of 0.05% to 0.8% is preferred. A zirconium fraction of about 0.5% is particularly advantageous. The preceding percentage details are weight percent. The aluminium alloy exclusively consists of aluminium apart from unavoidable impurities due to manufacture.

The electrolyte preferably used here consists of an aqueous acid or an aqueous lye to which at least one halogen and at least one surfactant is added. Halogens are fluorine, chlorine, bromine, iodine, astatine and ununseptium. Particularly fluorine, chlorine, bromine and iodine are considered as the electrolyte. Fluorine is preferred here. The halogens are not used in pure form but in the form of fluorine compounds, in particular in the form of fluorine-containing salts, so-called fluorides. Surfactants are substances which reduce the surface tension of a liquid or the interface tension between two phases and enable or assist the formation of dispersions or act as solubilizers.

The acid or lye used for the electrolyte has a concentration of 10% to 40% in water. Preferred is a concentration in the range of 15% to 25%. Particularly advantageous is a concentration of about 20%. The halogen has a fraction of 0.1% to 4.0% inside the acid or lye. Preferred is a halogen fraction of 0.5% to 2.0%. A preferred halogen is potassium aluminium pentafluoride. The surfactant has a fraction of 0.1% to 2.0% in the acid or lye. A surfactant fraction of 0.2% to 1.0% is preferred. Sodium lauryl sulphate is preferred as surfactant. The preceding percentage details should each be understood as weight percent

The invention claimed is:

1. A metal-air battery comprising:
   a housing;
   at least one cathode disposed in the housing between an air space and an electrolyte space;
   at least one metal anode disposed in the electrolyte space;
   an air path leading through the housing from an air inlet of the housing, which is fluidically connected to the air space, to an air outlet of the housing, which is fluidically connected to the air space;
   an air supply device for generating an air flow which follows the air path and acts upon the at least one cathode;
   an electrolyte path leading through the housing from an electrolyte inlet of the housing, which is fluidically connected to the electrolyte space, to an electrolyte outlet of the housing, which is fluidically connected to the electrolyte space; and
   an electrolyte supply device for producing an electrolyte flow which follows the electrolyte path and acts upon the at least one metal anode and the at least one cathode.

2. The battery according to claim 1, wherein the at least one cathode separates the air space from the electrolyte space so that the at least one cathode is acted upon by air located in the air space and electrolyte located in the electrolyte space.

3. The battery according to claim 1, wherein the at least one cathode is a hollow body.

4. The battery according to claim 3, wherein the at least one cathode is one of a cylindrical hollow body or a rectangular hollow body having one of a round cross-section or a polygonal cross-section.

5. The battery according to claim 3, wherein:
   the at least one cathode encloses the electrolyte space and is enclosed by the air space;
   the at least one metal anode is located in the interior of the at least one cathode; and
   the housing surrounds the air space.

6. The battery according to claim 1, wherein the at least one metal anode is arranged relative to the at least one cathode so that a longitudinal central axis of the at least one cathode and a longitudinal central axis of the at least one metal anode run parallel to one another.

7. The battery according to claim 1, wherein the at least one metal anode is configured as a solid.

8. The battery according to claim 1, further comprising a control device for operating the metal-air battery, the control device being electrically connected to the air supply device and to the electrolyte supply device, wherein the control device is at least one of configured and programmed so that, depending on a current electrical power requirement at the metal-air battery, the control device actuates at least one of the air supply device for producing an air flow adapted to the power requirement and the electrolyte supply device for producing an electrolyte flow adapted to the power requirement.

9. The battery according to claim 8, wherein the control device is at least one of configured and programmed so that, depending on the current electrical power requirement, the control device actuates the electrolyte supply device to produce an electrolyte flow adapted to the power requirement and actuates the air supply device to produce an air flow adapted to the adapted electrolyte flow.

10. The battery according to claim 8, wherein the control device is at least one of configured and programmed so that, for shutting down the metal-air battery, the control device actuates the electrolyte supply device for emptying the electrolyte path of electrolyte.

11. The battery according to claim 1, wherein the at least one metal anode is mounted rotatably about its longitudinal central axis on the housing.

12. The battery according to claim 11, further comprising a rotary drive for rotatingly driving the at least one metal anode.

13. The battery according to claim 12, wherein the at least one metal anode is configured so that a rotation of the at least one metal anode drives the electrolyte in the electrolyte path.

14. The battery according to claim 13, wherein the at least one metal anode has flow-guiding structures on its outer side exposed to the electrolyte space which drive the electrolyte when the at least one metal anode is rotating.

15. The battery according to claim 14, wherein the electrolyte path is guided past the at least one metal anode so that the electrolyte flow rotatingly drives the at least one metal anode.

16. The battery according to claim 15, wherein the electrolyte inlet is arranged tangentially to the electrolyte space at a first end region of the electrolyte space, and the electrolyte outlet is arranged at a second end region of the electrolyte space.

17. The battery according to claim 15, wherein the at least one metal anode has flow-guiding structures on its outer side exposed to the electrolyte space, the flow-guiding structures transmitting a torque to the at least one metal anode when the at least one metal anode is exposed to the electrolyte flow.

18. The battery according to claim 1, wherein the at least one metal anode is configured to be cylindrical and is connected mechanically and electrically to a metal supporting plate.

19. The battery according to claim 18, wherein the metal supporting plate is mounted rotatably about a longitudinal central axis of the at least one metal anode via an axial bearing on the housing.

20. The battery according to claim 19, further comprising an anode-side power formed on the axial bearing.

21. The battery according to claim 19, wherein the axial bearing comprises a sliding metal ring which lies in a housing-side annular bearing shell and on which the supporting plate rests and slides when the at least one metal anode is rotating.

22. The battery according to claim 21, wherein the sliding metal ring comprises an annular body composed of a sliding metal alloy and at least one heating conductor arranged in the annular body and configured to heat the annular body.

23. The battery according to claim 22, wherein a power supply of the heating conductor is configured so that the heating conductor heats the annular body to a predetermined operating temperature which lies below a melting point of the sliding metal alloy but allows a surface melting to occur on the annular body.

24. The battery according to claim 1, wherein the air supply device has a concentrating device upstream of the air inlet which increases an oxygen fraction in the air flow.

25. The battery according to claim 1, wherein the electrolyte supply device comprises an electrolyte circuit which includes a flow leading from an electrolyte tank to the electrolyte inlet, and a return leading from the electrolyte outlet to the electrolyte tank.

26. The battery according to claim 25, wherein a flow pump for driving the electrolyte is located in the flow.

27. The battery according to claim 25, wherein a return pump for driving the electrolyte is located in the return.

28. The battery according to claim 25, wherein an electrolyte cleaning device for removing reaction products from the electrolyte is located in the return.

29. The battery according to claim 25, wherein a gas separating device for removing gases from the electrolyte is located in the return.

30. The battery according to claim 29, wherein the gas separating device is fluidically connected via a gas line to a conversion device for converting chemical energy of the separated gas into at least one of electrical and thermal energy.

31. The battery according to claim 30, wherein the conversion device is a catalytic burner.

32. The battery according to claim 30, wherein the conversion device is a hydrogen-air fuel cell.

33. The battery according to claim 1, wherein at least one of:
the air inlet is arranged tangentially to the air space; and
the air outlet is arranged tangentially to the air space.

34. The battery according to claim 1, further comprising an induction heating for heating the at least one metal anode.

35. The battery according to claim 34, wherein the induction heating is arranged in a region of the at least one cathode.

36. A battery system comprising:
a plurality of metal-air batteries each having:
    a housing;
    at least one cathode disposed in the housing between an air space and an electrolyte space;
    at least one metal anode disposed in the electrolyte space;
    an air path leading through the housing from an air inlet of the housing, which is fluidically connected to the air space, to an air outlet of the housing, which is fluidically connected to the air space; and
    an electrolyte path leading through the housing from an electrolyte inlet of the housing, which is fluidically connected to the electrolyte space, to an electrolyte outlet of the housing, which is fluidically connected to the electrolyte space; and
at least one of:
    a common air supply device for producing respective air flows through the air paths of the metal-air batteries;

a common electrolyte supply device for producing respective electrolyte flows through the electrolyte paths of the metal-air batteries; and a common control device for operating the metal-air batteries.

37. A vehicle comprising:

an electric-motor drive having a power supply, and one of:

at least one metal-air battery having:
- a housing;
- at least one cathode disposed in the housing between an air space and an electrolyte space;
- at least one metal anode disposed in the electrolyte space;
- an air path leading through the housing from an air inlet of the housing, which is fluidically connected to the air space, to an air outlet of the housing, which is fluidically connected to the air space;
- an air supply device for generating an air flow which follows the air path and acts upon the at least one cathode;
- an electrolyte path leading through the housing from an electrolyte inlet of the housing, which is fluidically connected to the electrolyte space, to an electrolyte outlet of the housing, which is fluidically connected to the electrolyte space; and
- an electrolyte supply device for producing an electrolyte flow which follows the electrolyte path and acts upon the at least one metal anode and the at least one cathode; or a battery system including:

a plurality of metal-air batteries each having:
- a housing;
- at least one cathode disposed in the housing between an air space and an electrolyte space;
- at least one metal anode disposed in the electrolyte space;
- an air path leading through the housing from an air inlet of the housing, which is fluidically connected to the air space, to an air outlet of the housing, which is fluidically connected to the air space; and
- an electrolyte path leading through the housing from an electrolyte inlet of the housing, which is fluidically connected to the electrolyte space, to an electrolyte outlet of the housing, which is fluidically connected to the electrolyte space; and at least one of:
- a common air supply device for producing respective air flows through the air paths of the metal-air batteries;
- a common electrolyte supply device for producing respective electrolyte flows through the electrolyte paths of the metal-air batteries; and
- a common control device for operating the metal-air batteries;

wherein a power electronics for the power supply of the electric-motor drive is coupled unbuffered to the one of the at least one metal-air battery or the battery system.

38. A method for operating a metal-air battery, comprising:

generating at least one of an electrolyte flow and an air flow depending on a current power requirement at the metal-air battery;

wherein the metal-air battery includes:
- a housing;
- at least one cathode disposed in the housing between an air space and an electrolyte space;
- at least one metal anode disposed in the electrolyte space;
- an air path leading through the housing from an air inlet of the housing, which is fluidically connected to the air space, to an air outlet of the housing, which is fluidically connected to the air space;
- an air supply device for generating the air flow which follows the air path and acts upon the at least one cathode;
- an electrolyte path leading through the housing from an electrolyte inlet of the housing, which is fluidically connected to the electrolyte space, to an electrolyte outlet of the housing, which is fluidically connected to the electrolyte space; and
- an electrolyte supply device for producing the electrolyte flow which follows the electrolyte path and acts upon the at least one metal anode and the at least one cathode.

39. The method according to claim 38, further comprising at least one of:

controlling at least one electrolyte conveying device to increase or reduce its conveying capacity for adapting the electrolyte flow; and controlling the at least one air conveying device to increase or to reduce its conveying capacity for adapting the air flow.

* * * * *